March 15, 1938.  G. F. DALY  2,110,853
TABULATING MACHINE
Filed March 16, 1933   9 Sheets-Sheet 1

INVENTOR
George F. Daly
BY  ATTORNEY

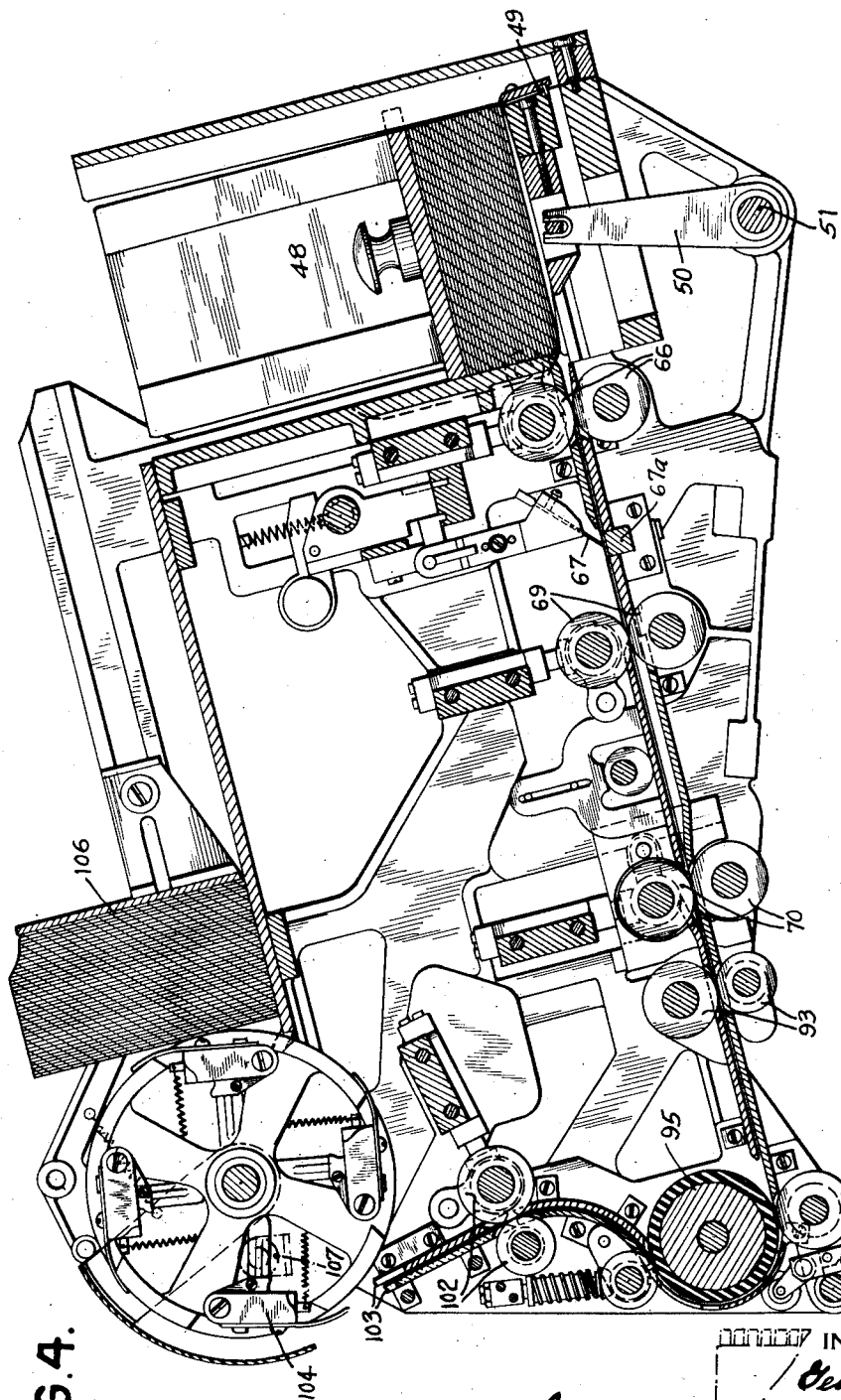

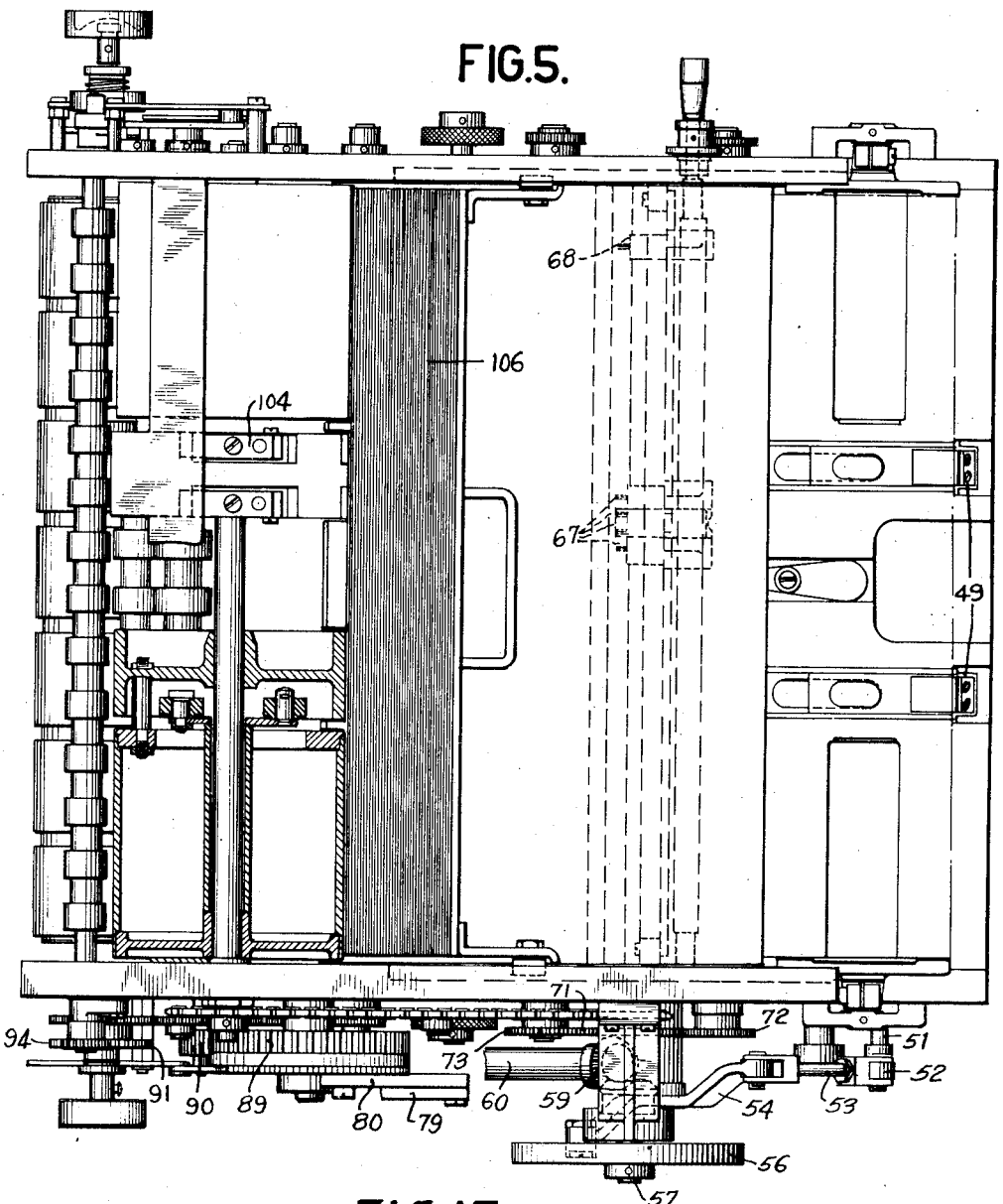
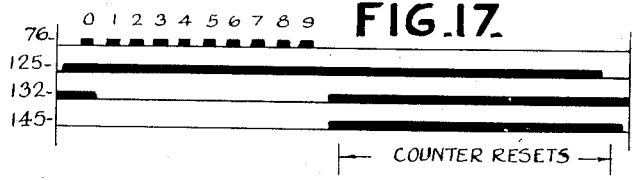

March 15, 1938.    G. F. DALY    2,110,853
TABULATING MACHINE
Filed March 16, 1933    9 Sheets-Sheet 4
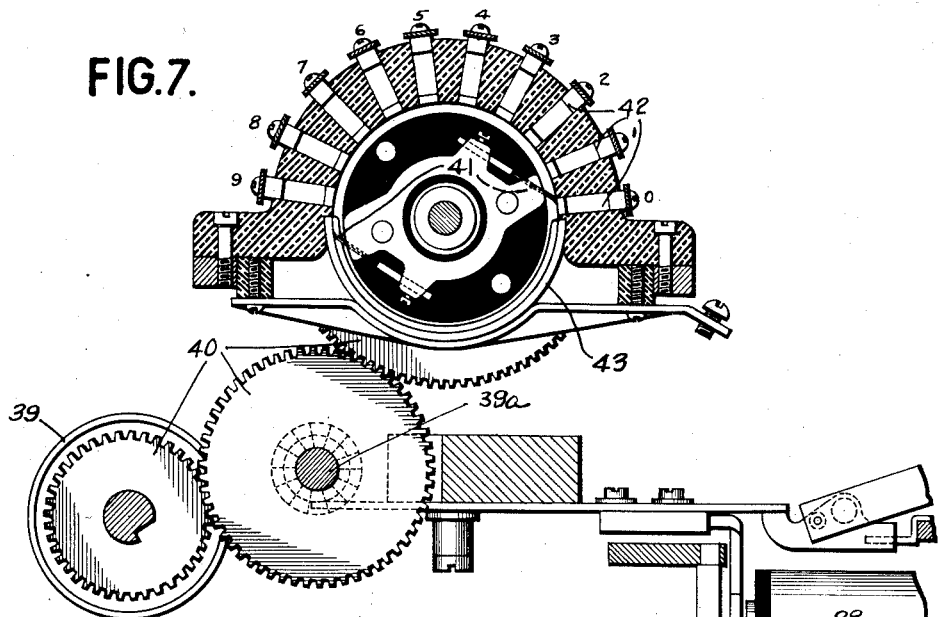
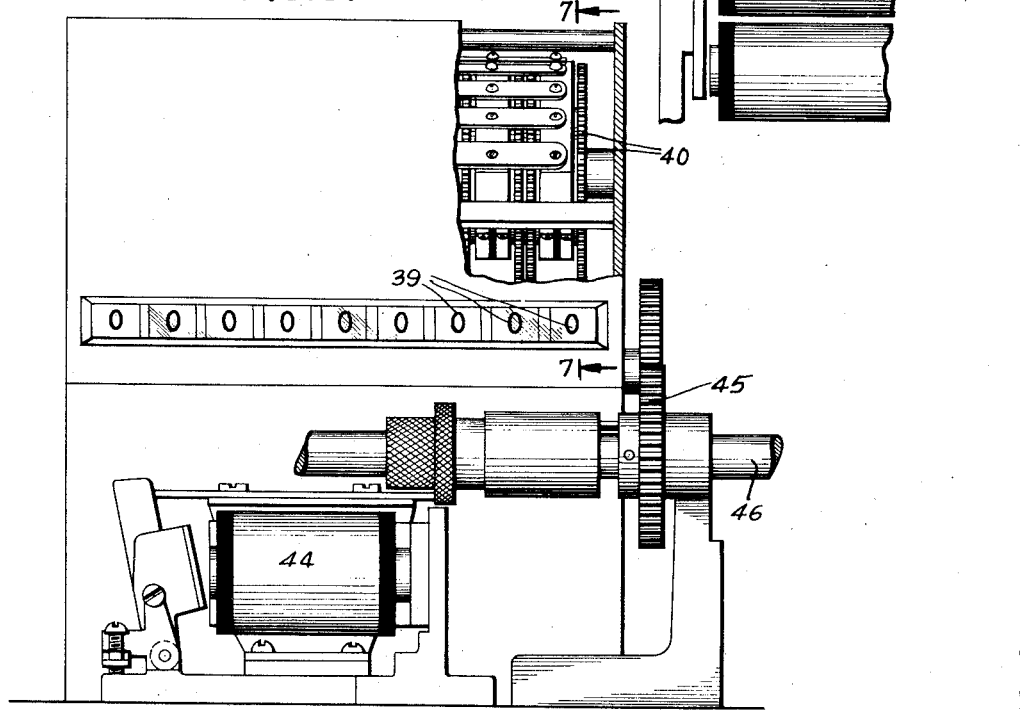
INVENTOR
George F. Daly
BY
ATTORNEY March 15, 1938.  G. F. DALY  2,110,853
TABULATING MACHINE
Filed March 16, 1933   9 Sheets—Sheet 5
FIG.8.
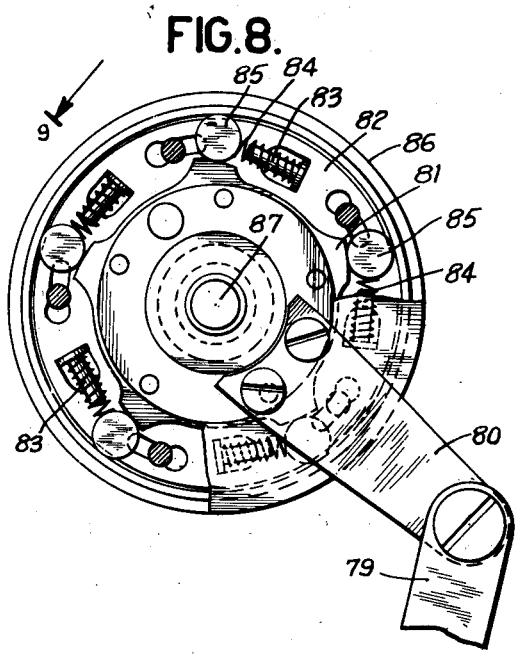
FIG.9.
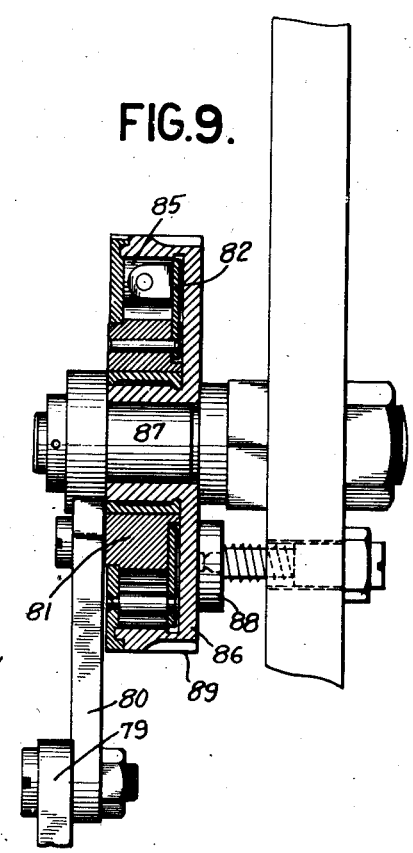
FIG.10.
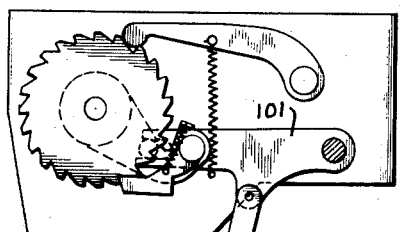
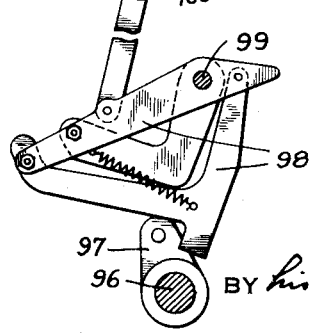
FIG.18.
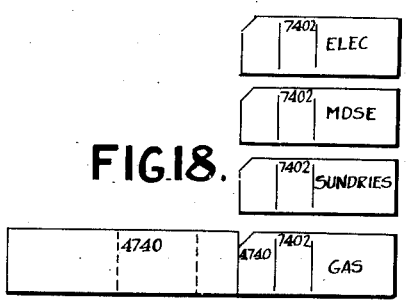
INVENTOR
George F. Daly
BY his ATTORNEY
Wm Wilson March 15, 1938.  G. F. DALY  2,110,853
TABULATING MACHINE
Filed March 16, 1933  9 Sheets-Sheet 6

INVENTOR
George F. Daly
BY
W. M. Wilson
ATTORNEY

March 15, 1938.  G. F. DALY  2,110,853
TABULATING MACHINE
Filed March 16, 1933   9 Sheets-Sheet 7

INVENTOR
George F. Daly
BY
W. M. Wilson
ATTORNEY

March 15, 1938.     G. F. DALY     2,110,853
TABULATING MACHINE
Filed March 16, 1933     9 Sheets-Sheet 8

March 15, 1938.                G. F. DALY                2,110,853
                           TABULATING MACHINE
                         Filed March 16, 1933         9 Sheets-Sheet 9

Patented Mar. 15, 1938

2,110,853

UNITED STATES PATENT OFFICE 2,110,853

TABULATING MACHINE

George F. Daly, Johnson City, N. Y., assignor, by mesne assignments, to International Business Machines Corporation, New York, N. Y., a corporation of New York Application March 16, 1933, Serial No. 660,991

7 Claims. (Cl. 235—61.7)

This invention relates to printing mechanism for tabulating machines or the like and is primarily directed to the provision of means for selectively feeding classified record sheets to a printing device for receiving data of a related classification.

One object of the invention is to provide improved comparing mechanism for comparing classification data on a record sheet or bill with classification data on a controlling record card and for automatically initiating printing operations under control of other data on the card. The comparing mechanism includes an entry receiving and retaining device which is adapted to receive an entry from a record card during a tabulating cycle of operations. During a subsequent total taking and resetting cycle of operations data are read from the record bill and a comparison made between this data and the data in the entry receiving device. If they are in agreement, the device is immediately reset and tabulating operations take place during which entries are made on the bill in accordance with perforations in the record card. Automatic group control devices are employed to permit a series of entries to be made on the bill from a series of related cards comprising a group.

A further object of the invention resides in the provision of separate control or comparing devices, one to determine the relationship between the bill and the leading card of a group, and the other to determine the relationship between the cards comprising the group. This arrangement lends flexibility to the machine and widens the scope of its practical application.

A still further object is to provide a visible indication of an improved nature whereby upon interruption in machine operation, the operator can immediately see the relationship between the card and bill in operative position and determine therefrom the necessary subsequent manipulation of the machine.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 4 is a sectional elevation of the bill feeding mechanism.

Fig. 5 is a plan view of the bill feeding mechanism.

Fig. 6 is a front elevation of the entry receiving device which receives the classification data to be compared.

Fig. 7 is a section taken on line 7—7 of Fig. 6.

Fig. 8 is a detail of a bill feeding clutch device shown in Fig. 1.

Fig. 9 is a section on line 9—9 of Fig. 8.

Fig. 10 is a detail of the bill line spacing mechanism.

Fig. 11 is a detail of a bill.

Fig. 12 is a detail of a record card.

Figure 13:
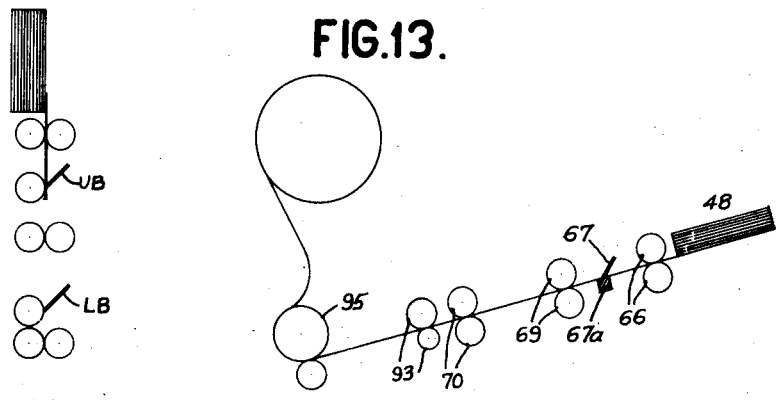
Figure 14:
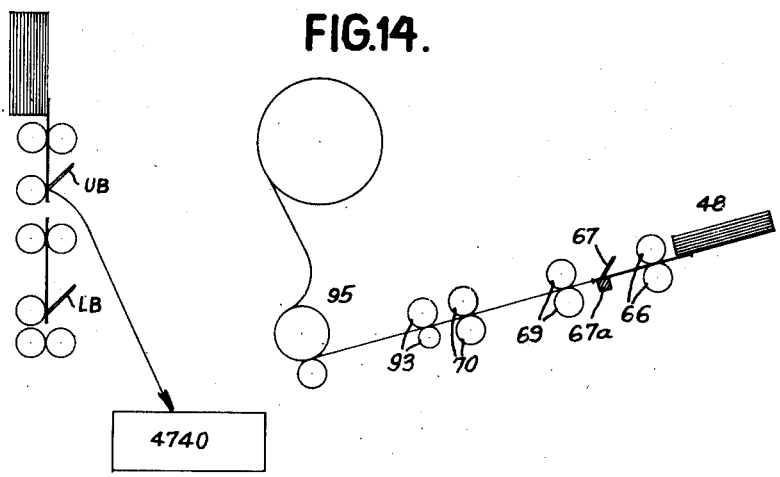
Figure 15:
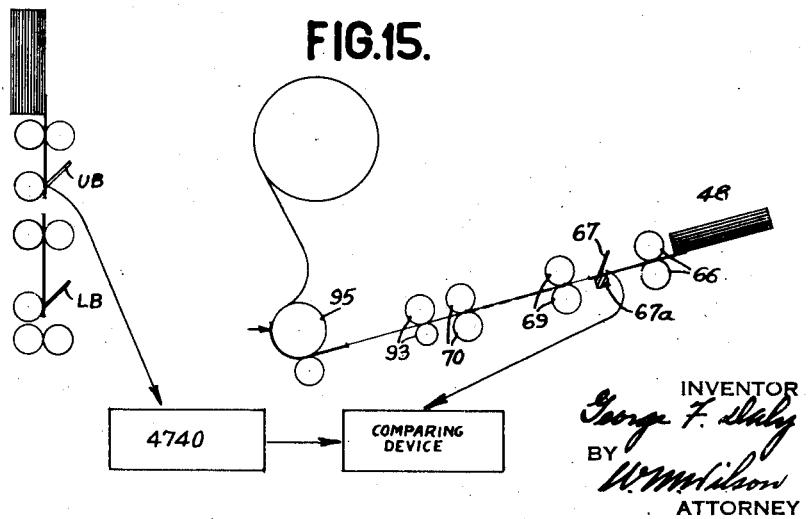

Figs. 13, 14, and 15 are diagrammatic views showing the various relative positions of the bills and record cards.

Figure 16:
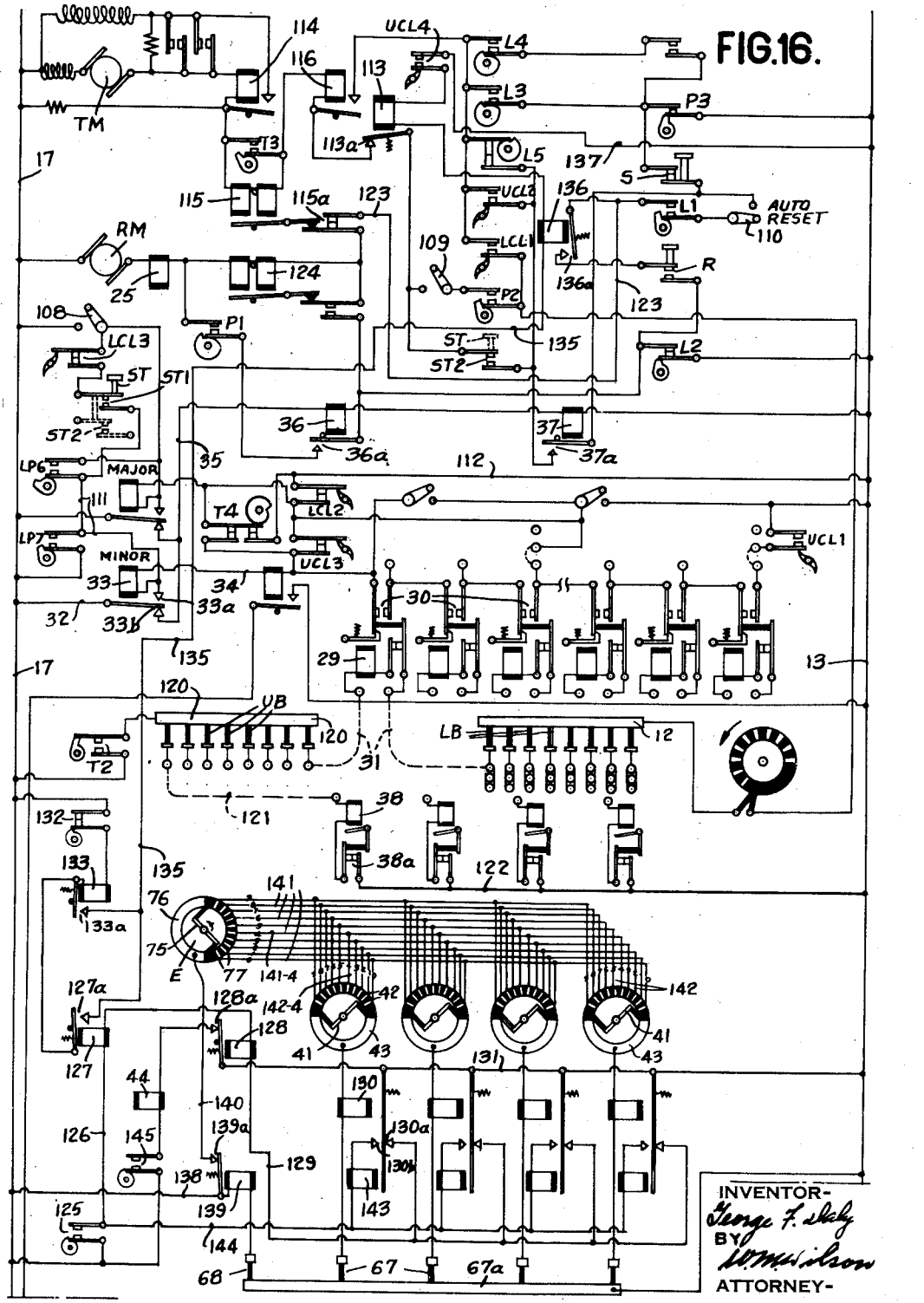
Figure 16A:
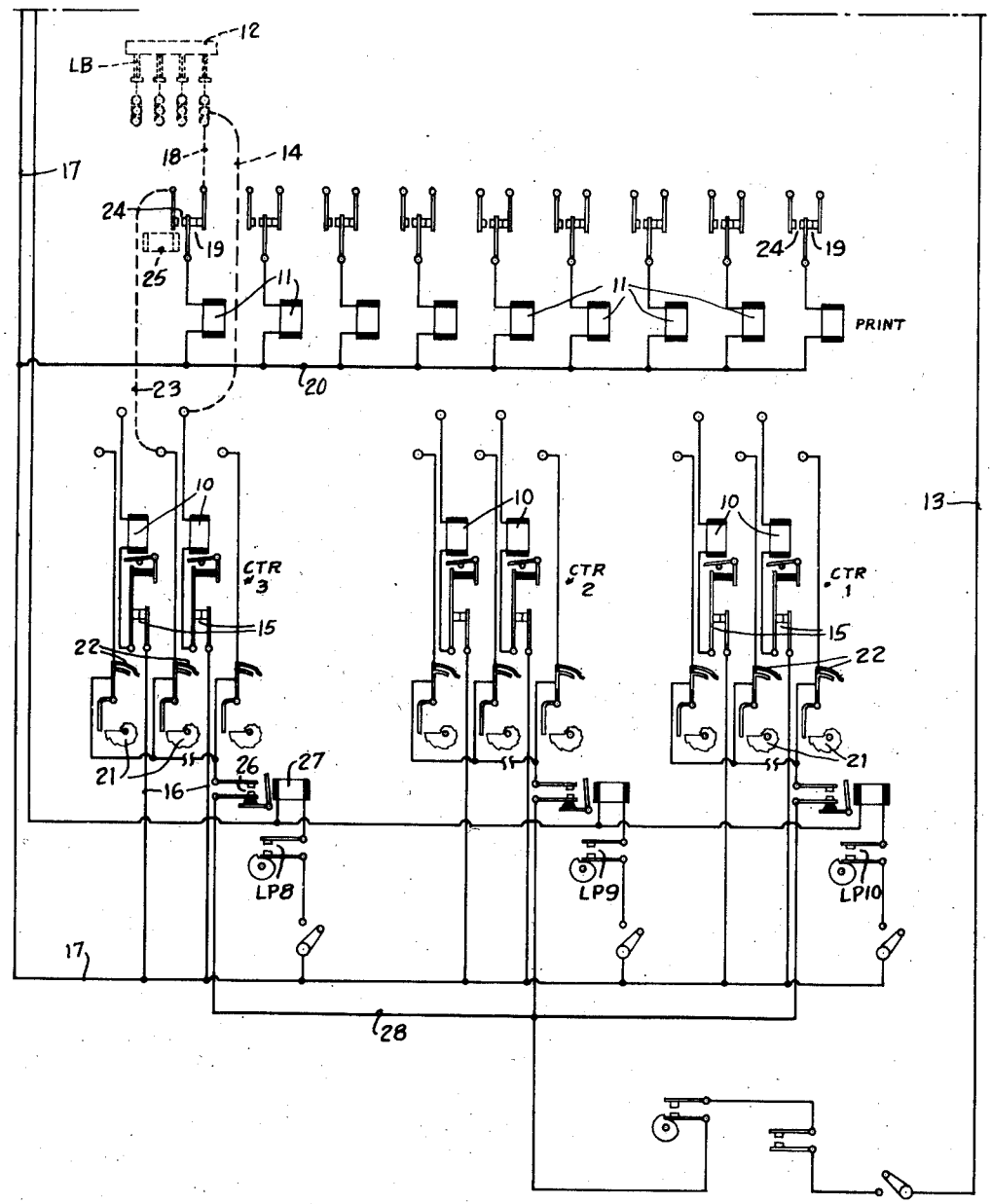

Figs. 16 and 16a taken together comprise a wiring diagram of the electric circuits of the machine.

Fig. 17 is a timing diagram of certain of the contact devices which function during total taking operations.

Fig. 18 is a diagrammatic showing of a group of cards.

In order that the detail description may be followed to better advantage, a general statement will be herein given of the operation of the machine in connection with a specific application and the operation will be described as being applied to a public utility billing system, but it is understood that the invention may with equal facility be used in any other commercial establishment and in many other relations.

In many public utility systems where the number of bills to be prepared is of considerable volume and it is a desideratum to have them completely prepared as soon after the acquisition of the controlling data as possible, the bills are addressed some time previous so that when all the necessary data have been collected it remains but to enter the charges and other items. Preprinted and prepunched bill forms are made use of which may consist of several sections such as, the bill proper, the cashier's coupon, the collection coupon and a tabulating card. Figs. 11 and 12 show such a form, it being understood that Fig. 12 is integral with and forms a continuation of Fig. 11 before severance. The sections are each printed with a serial number for example "4740" which number is also prepunched in the cashier's coupon and in the "Serial No." field of the card (Fig. 12). These perforations are made in accordance with the well known Hollerith system of indicating numerical values in vertically spaced index point positions.

The forms are then addressed in each section as shown and the card portions severed. The remainder of the bill is then set aside until the advent of the billing period. The card (Fig. 12) may then be perforated with pertinent information relating to one type of service. The customer's permanent account number for example "7402" is also perforated in the "Acct. No." field. For each other type of service to be charged against the customer's account, a separate card similar to Fig. 12 is prepared in which the customer's account number is perforated but which does not have the serial number. In the instant example, there will be four tabulating cards for the same account, 7402 viz. a "Gas" card, a "Sundries" card, a "M'd'se" card and an "Electric" card. The "Gas" card which contains the serial number punching is placed at the head of the group and is the first card of the group to be fed through the machine.

At the commencement of billing operations, then, there will be a set of serially numbered and arranged, addressed bills in their original order and a set of cards comprising groups of one or more cards relating to the several accounts. The groups of cards have been sorted into the same order as the bills and the card having the serial number leads its account number group.

In Fig. 18 is shown diagrammatically a group of cards and a related bill. As explained, the first card, which was originally attached to the bill, contains the "Serial No. 4740" by means of which the card is later identified as belonging to the similarly numbered bill. A further, separate card is made out for each additional item for which the customer is to be billed. These further cards bear no relation to any bills and in order to provide identification, all the cards, including the first, are perforated in accordance with the customer's "Account No. 7402." Thus through the "Account No. 7402" all the cards of Fig. 18 are identified as belonging to the same customer and through comparison of the "Serial No. 4740" of the first card with the "Serial No. 4740" of the bill, the correct relationship is secured to bring about listing of the items of all the cards on the one bill. It is, of course, apparent that the number of cards related to any bill varies according to the number of items to be billed, so that if but a single item is billed, there will be but the bill and the first card.

*General operation of tabulating machine*

The tabulating machine to which the improvements of the present invention are especially adapted may be of the type disclosed in Patent No. 1,762,145 granted to G. F. Daly and R. E. Page on June 10, 1930. The operation of the machine in the performance of functions which are similar to those of said patent and which are necessary to an understanding of the invention will first be briefly outlined after which the improvements will be explained in greater detail.

Figs. 16 and 16a illustrate the wiring of the complete machine. During listing and adding operations the machine is driven by a tabulating motor TM controlled by a group of cam and relay controlled circuits to be traced later and during total taking operations the machine is driven by a reset motor RM controlled in a manner to be explained. When the tabulating motor TM is in operation, the tabulating cards bearing differentially arranged index points representing digits are fed first beneath the upper analyzing brushes UB and exactly one machine cycle later beneath the lower analyzing brushes LB. Figs. 13, 14, and 15 show the card feeding rollers and brushes UB and LB diagrammatically.

As the cards pass the lower brushes, perforations in the index point positions will instantaneously close circuits through the proper lower analyzing brushes LB to energize counter magnets 10 (Fig. 16a) or printer magnets 11 or both together.

As usual the timed energizations of these magnets control mechanism for entering the data corresponding to the card reading on the counter wheels or for stopping the type bar at the corresponding printing position. These functions do not enter specifically into the present invention and will not be described in detail as they are well understood and fully explained in the patent referred to. For greater flexibility, the entering circuit arrangements have been altered so that data may be added in any counter position and printed in any printer position. A representative adding circuit traced as follows will make this clear. In Figs. 16 and 16a the common conductor 12 for the brushes LB is connected to the right side of line 13 through the usual control devices and upon the arrival of a perforation at the brush station current will flow from common 12 (Fig. 16a), hole in the card, brush LB, plug connection 14, adding magnet 10, contacts 15, wire 16 to left side of line 17. If printing is desired, a plug connection 18 is made between brush LB and a pair of normally closed contacts 19. A circuit is then traceable from common 12, brush LB, connection 18, contacts 19, printing magnet 11, wire 20 to left side of line 17.

During total taking operations, printing is controlled by the usual stepped cams 21 and contacts 22 which latter may be connected by a suitable plug connection 23 to normally open contacts 24 associated with a selected printing magnet 11. During total taking operations a magnet 25 is energized, in a manner to be explained later, to cause closure of contacts 24 and opening of contacts 19. A total printing circuit is thereupon traceable from line 17, wire 20, printing magnet 11, contacts 24, connection 23, contacts 22 (whose time of closure is in accordance with the amount contained in the adding wheel), contacts 26 (closed by magnet 27) during total taking operations, wire 28 to right side of line 13 through the usual control contacts and switches.

The usual automatic control unit is also provided to cause the machine to either stop or automatically enter upon total taking operations when the group numbers which in the present case are the "Account" numbers relating to particular customers of successively fed cards fail to agree. This unit is the same as heretofore employed in machines and requires no detailed description. Briefly, one of the magnets 29 (Fig. 16) is plug connected in series between the upper and lower brushes of each column selected for automatic control as by plug connections 31 and the contacts 30 of the selected magnets are connected in series with each other in the control circuit which will be traced presently. When the control perforations in the cards under the upper and lower brushes agree, the selected magnets 29 will be energized momentarily and their contacts 30 closed. The contacts when once closed, will remain so until the end of the machine cycle and then open.

The minor control circuit is traceable as follows: from line 17, wire 32, minor relay points 33a, minor relay 33, wire 34, series contacts 30, upper card lever contacts UCL1 to right side of line 13. If one of the contacts selected fails to close, this circuit is interrupted and causes deenergization of relay 33 which thus permits closure of its points 33b. A circuit is then established from line 17, wire 32, points 33b, wire 35, reset control relay 36, motor control relay 37 to line 13. The relays open their respective points 36a and 37a, the latter functioning to break the tabulating motor circuit. Contacts T4 serve to hold relay 33 energized while contacts 30 are being set under card control.

The above sets forth in brief the usual operations of the tabulating machine to which the present improvements are applied.

Serial number indicator

Figs. 6 and 7 show the indicator mechanism which has been applied to a tabulating machine and which is adapted to receive and retain the serial number as punched in the first card of each group.

The general construction is similar to that of the accumulators, energization of a magnet 38 causing coupling of indicating wheel 39 to the continually running counter drive shaft 39a. Wheel 39 is thereby turned an amount proportional to the value of the index point perforation sensed. Connected to wheel 39 by means of gearing 40 is a pair of electrically connected brushes 41 which are carried by and insulated from the uppermost gear 40. The brushes cooperate with a plurality of conducting segments 42 and a common arcuate conducting strip 43. The relationship is such that with wheel 39 positioned to represent a particular number, one of the brushes 41 will be in contact with the correspondingly numbered segment 42 and the second brush will be in contact with strip 43. After the serial number of a card has been set up on this device, a comparison is made with the serial number of the bill, as will be hereinafter explained, following which the device is reset to zero. The resetting is effected in the same manner as for the usual counters. Magnet 44, upon energization during a total taking and resetting cycle, is adapted to cause coupling of the resetting gear 45 of the device with shaft 46 which rotates during such cycles. This action zeroizes the device in the same manner as the usual counter wheels.

Bill feeding mechanism

Figure 1:
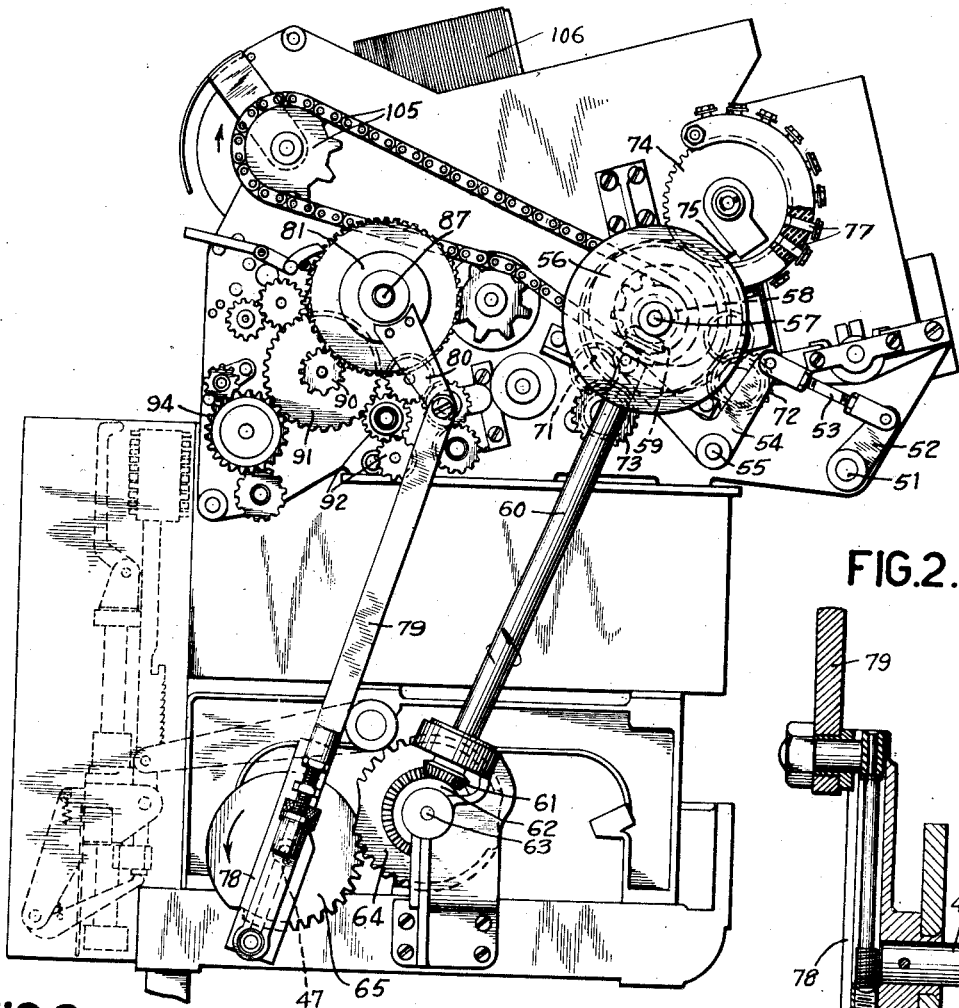
Fig. 1 is an elevational view of the outside of the printing and bill feeding mechanism of the machine.
Figure 2:
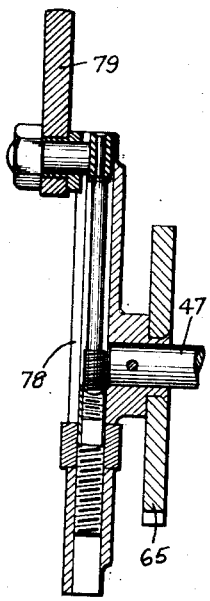
Fig. 2 is a detail section of a crank linkage shown in Fig. 1.

The bill feeding mechanism is shown in Figs. 1, 4, and 5 and is controlled from the total shaft 47 of the machine which is adapted to make one revolution during a total taking and resetting operation of the machine. Bills, prepunched with the serial number are placed in the supply hopper 48 from which they are fed singly by a picker knife 49 mounted for reciprocation in the frame of the machine. An operating arm 50 is secured to a shaft 51 which carries an arm 52 at one extremity (Fig. 1). Arm 52 is connected by a link 53 to a bell crank 54 pivoted at 55 and having a follower roller in engagement with a box cam 56 carried by a shaft 57.

Figure 3:
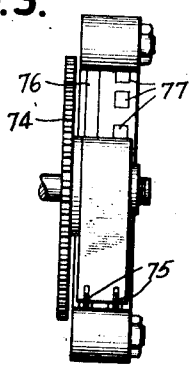
Fig. 3 is a detail of an impulse emitter shown in Fig. 1.

Integral with cam 56 is a bevel gear 58 meshing with a bevel gear 59 on one end of an oblique shaft 60 whose lower end has a bevel gear 61 in mesh with a bevel gear 62 rotatable on a stud 63. Secured to gear 62 is a toothed member 64 which is adapted to be intermittently driven by a toothed member 65 carried by the total shaft 47. The ratio of the drive is such that during the first half revolution member 65 causes cam 56 to make a full turn and reciprocate picker knife 49 once to feed a bill to feed rollers 66 which convey it past analyzing brushes 67 and a so-called card lever brush 68 (Fig. 5) and then to feed rollers 69 which advance it into engagement with feed rollers 70. Rollers 66 and 69 are driven by a gear 71 on shaft 57 which meshes with pinions 72 and 73 on the lower shafts of rollers 66 and 69 respectively. Also driven by gear 71 is a gear 74 (Fig. 3) which carries, insulated therefrom, a pair of electrically connected brushes 75 of which one cooperates with an arcuate conducting strip 76 and the other with a column of segments 77. Brushes 75 successively connect the segments 77 and strip 76 as the corresponding index point positions of the bill are sensed by brushes 67. It may be stated here that the bills are placed face down in the hopper 48 and that they are fed with their top edges first so that the index point positions pass brushes 67 in the order 0—1—2—3—4—5—6—7—8—9. The manner in which segments 77 cooperate electrically with brushes 67 will be explained in connection with the wiring diagram.

Further advance of the bill is effected during the second half revolution of shaft 47 through the action of crank arm 78 as it rocks through substantially 180 degrees back to the position of Fig. 1. During the first 180 degrees of movement of arm 78, link 79, connected thereto, rocked an arm 80, connected at its upper end, in a counterclockwise direction.

Referring to Figs. 8 and 9, arm 80 is attached to a cam member 81 to which is secured a disk 82 which is provided with spring supporting pins 83. Springs 84 urge friction rollers 85 between the camming portions of member 81 and the inner periphery of a drum 86 which is mounted for rotation about a stud 87. A spring pressed friction shoe 88 tends to restrain movement of drum 86. With the above construction it is apparent that during the counterclockwise movement of arm 80, cam member 81, plate 82 and rollers 85 turn in the same direction without disturbing drum 86. On the return stroke of arm 80, however, rollers 85 are wedged between the cam surfaces of member 81 and drum 86, causing the latter to move therewith in a clockwise direction.

Drum 86 is provided with teeth 89 which mesh with a pinion 90, secured to a gear 91. Gear 91 through pinions 92 drives feed rollers 70 and 93 and through a gear 94 drives the printing platen 95 so that the bill is advanced around the platen a distance sufficient to bring the first line of the bill into printing position.

From this position the bill is advanced step by step as items are listed thereon, by means of the usual spacing devices, shown in Fig. 10 where 96 represents the printing cross-head operating shaft which is oscillated once for each operation of the printing mechanism. An arm 97 carried by shaft 96 rocks a structure 98 pivoted at 99 and which has link connection 100 with platen pawl operating arm 101.

During the second half of the subsequent total taking cycle the bill is advanced by the platen and rollers 102 through guides 103 to a position where the leading edge of the bill lies within the open jaws of stacker clips 104. The stacker is of conventional structure, driven as shown in Fig. 1 by sprocket and chain connection 105 from shaft 57 during the first half of the total taking cycle, so that it is not until the next succeeding total taking cycle that clips 104 close on the leading edge of the bill and swing it around into stacker 106. A fixed roller 107 engages clip 104 to open the same against the tension of its spring as it passes through the bill receiving position.

Wiring diagram

The complete operation of the machine will now be described in connection with the wiring diagram (Figs. 16 and 16a) with particular reference to the preparation of a bill as in Fig. 11 under control of a group of cards of which the card in Fig. 12 is the leading card. With the tabulating cards placed in the feed hopper of a tabulator of the type disclosed in Patent No. 1,762,145, and the bills placed in the hopper 48 of the machine disclosed in this application the start key ST is depressed to close pairs of contacts ST1 and ST2 (see Fig. 16). Previously to this, switches 108, 109, and 110 will have been closed to provide for the continuous automatic operation of the machine. Closure of contacts ST1 will prepare the minor control circuit for operation.

In previous machines of this type it has been customary to send the machine through a resetting cycle of operations during which the minor control circuit was set up. In the present machine, however, this setting up is taken care of by the closure of contacts ST1 concurrently with the usual starting operation of the machine. Closure of contacts ST1 will complete a circuit from line 17, switch 108, lower card lever contacts LCL3, contacts ST1, wire 111, minor relay 33, contacts UCL3, LCL2 and wire 112 to right side of line 13. Relay 33 thus energized will attract its armature which will complete the usual holding circuit for the relay which will thereupon remain energized until the occurrence of a group number change.

Concurrently with this operation, the closure of contacts ST2 will complete the usual tabulating motor circuit to commence feeding cards. This circuit is traceable from line 17, motor TM, motor relay 114, tabulating clutch magnet 115, start relay 116, relay points 113a, start key contacts ST2, relay points 37a now closed, stop key contacts S, cam contacts P3, to line 13.

A cycle of operations of the tabulator will be thus initiated during which the first card is advanced by the picker to the upper brushes and at the end of this cycle the first card will have its leading edge at the upper brushes UB as indicated diagrammatically in Fig. 13.

The continued depression of the start key will send the machine through a second cycle during which the upper card lever contacts are open and at the end of which the lower card lever contacts LCL3 open to interrupt the circuit through contacts ST1. During this cycle the serial number on the leading card of the group is analyzed by the upper brushes and the number is entered into the indicating counter through circuits of which the following is representative: from line 17, cam contacts T2, upper brush common 120, perforation in the serial number field of the card, upper brush UB, plug connection 121, indicating counter magnet 38, break contacts 38a, wire 122, to right side of line 13. In this manner, the serial number is entered into the several orders of the counter as the card passes the upper brushes UB. It will, of course, be understood that the remaining cards in the same group have no perforations in the serial number field so that as these other cards pass the brushes during subsequent cycles, no entries will be made into the indicating counter.

At the end of the second cycle, the cards will have been advanced to the position diagrammatically indicated in Fig. 14 with the first card at the lower brushes and the second card at the upper brushes. Also during the same cycle, the usual automatic control mechanism will have functioned to automatically initiate a total taking and reset cycle of operations upon closure of contacts L1 (Fig. 16). The circuit is traceable from line 13, contacts P3, contacts S, switch 110, contacts L1, wire 123, contacts 115a, reset clutch magnet 124, multi-contact relay 25, motor RM, to line 17.

During this cycle the first bill will be advanced to the position indicated in Fig. 14, in which position the leading edge of the bill is between the brushes 67 and the common bar 67a and the card lever brush 68 is thereby insulated from the common bar. The machine then comes to rest and can only be restarted by depression of the reset key R (Fig. 16). In this manner the proper sequence of feeding operations is preserved and is brought about under control of the following circuit completed under control of cam contacts 125, which closed during the previous reset cycle (see Fig. 17). The circuit may be traced from line 17, contacts 125, wire 126, relay magnets 127 and 128, wire 129, relay points 130a, wire 131, to right side of line 13. Relay points 130a are normally closed and open only when a comparison is made between the bill and the setting on the indicator, as will hereinafter be explained.

Energization of relay 127 will cause closure of its points 127a, setting up a further circuit from line 17, cam contacts 132, relay 133, wire 134, relay points 127a, wire 135, relay coil 136, relay coil 113, upper card lever contacts UCL4, wire 137, to line 13. Contacts 132 remain closed during subsequent tabulating operations (see Fig. 17) and relay 133, through its contacts 133a, provides a holding circuit to keep relay magnets 113 and 136 energized. The former will therefore hold its points 113a open. These points, as previously explained, are in the manual and automatic starting circuits of the tabulator so that resumption of operation of the tabulator by these devices is prevented.

Closure of points 136a will permit the initiation of a reset cycle of operations upon closure of reset contacts R. This circuit is traceable as follows: from line 13, contacts L2, reset contacts R, relay points 136a, wire 123, through the reset clutch magnet 124 and motor RM to left side of line, as traced above.

During this second reset cycle the bill is advanced from the position in Fig. 14 to the position in Fig. 15 where the first line to receive printing is at the printing position. During the first half of the cycle the perforations in the serial number field of the bill are analyzed by the brushes 67 and as they are analyzed, a comparison is made between these perforations and the data previously entered into the indicating counter under control of the serial number perforations in the first card. This comparing mechanism includes the emitter generally designated E in Fig. 16 whose brushes 75 successively connect the segments 77 with the common strip 76 in the order 0, 1, 2, 3, 4, etc. in synchronism with the analysis of the corresponding index point positions on the bill by the analyzing brushes 67. If the setting of the counter corresponds with the number on the bill, the circuits will be completed through the brushes 67 and the emitter E of which the following is representative: Assuming the brush 41 of the read-out device farthest to the right to be set at "4", a circuit would be completed when brush 75 of emitter E reaches the "4" segment as follows: from line 17, wire 138, relay points 139a wire 140, common strip 76, brushes 75, the "4" segment 77, wire 141—4 of a group of wires generally designated 141, wire 142—4, "4" segment 42, brushes 41, common strip 43, relay magnet 130, brush 67, perforation in the "4" index point position of the bill, common 67a, to right side of line 13.

Energization of relay 130 will open its points 130a and close its points 130b whereby the latter will complete a circuit from line 13, wire 131, relay points 130b, holding coil 143, wire 144, cam contacts 125, which are closed during the reset cycle, to line 17.

If all the perforations in the bill are in agreement with the setting of the indicating counter, the several relays 130 will be energized at times corresponding to the value of the setting in their respective positions and at the end of the reset cycle, all of the contact points 130a will be open so that no current path is provided for the circuit, above traced, through relays 127 and 128. Consequently, at the beginning of the second half of the reset cycle, contact points 128a will be closed and cam contacts 145, closing at this time (see Fig. 17), will complete a circuit from line 17, cam contacts 145, indicating counter reset magnet 44, relay points 128a, wire 131, to line 13. As explained, magnet 44 will couple the indicating counter to the resetting shaft so that during the second half of the reset cycle, the counter will be zeroized.

At the end of this reset cycle, the cards and bills will occupy the positions diagrammatically indicated in Fig. 15, where the first card is about to traverse the lower brushes LB and the first bill is in position to receive the first printing impression. A second card is about to pass the upper brushes and a second bill is in position beneath the brushes 67.

Toward the end of the reset cycle, the cam contacts P2 close and complete the usual automatic starting circuit whereupon card feeding operations will resume and printing will take place on successive lines of the bill under control of the lower brushes. This automatic starting circuit is traceable from line 17, motor TM, relay 114, magnet 115, relay 116, contacts 113a, switch 109, contacts P2, lower card lever contacts LCL1, upper card lever contacts UCL2, contacts 37a, S, and P3 to line 13. The automatic control devices will function to keep the tabulating devices in operation as long as successive cards agree in their "Account No." designating perforations.

As the last card of any group is passing the lower brushes, the first card of the following group will, of course, be passing the upper brushes and the serial number will be entered into the indicating counter at the same time that the account number fields on the two cards are being compared and the change in account number sensed by the automatic control mechanism. The machine will thereupon, under control of the automatic control mechanism, enter upon a total taking and reset cycle of operations, during the first half of which the total is printed on the bill in printing position and also during the first half of which a new bill is advanced past the brushes 67 and a comparison is made at such time with the data set up in the indicating counter. During the second half of the reset cycle, the new bill is advanced to printing position and the previous bill is advanced into engagement with the jaws of the stacker. If the comparing operation discloses an agreement between the bill and the indicating counter, the latter is conditioned for resetting during the second half of the cycle. If, however, there is a disagreement, the machine will stop, due to the interruption of the automatic start circuit by the opening of relay points 113a, as explained, and the indicating counter will not be reset. At this point, the serial number of the next group will be visible on the wheels of the indicating counter and the printed serial numbers of the bill which has been compared with the counter setting and of the last bill printed will also be visible in the bill feeding section so that the operator can determine the reason for the stopping of the machine.

If it is found upon inspection that a bill is present for which there are no record cards, this bill is removed by sending the machine through another reset cycle, which may be initiated by depression of the reset key R. Inspection of the circuit diagram will show that when the machine is stopped under conditions as outlined above, restarting can only be effected through the medium of the reset key.

The card brush lever 68 is provided to prevent the operation of the comparing devices unless there is a bill passing the brushes 67. In the circuit diagram are shown several cam controlled contact devices which are inherent in the machine and which have not been specifically described. Such devices have the same reference characters as the devices shown in Fig. 1 of Patent No. 2,056,395, issued to Garman et al. on October 6, 1936 and to which they correspond. These include contacts L4, L3, L5, UCL2, LCL1, T3, UCL1, LCL2, etc.

When the machine stops because of non-comparison and the operator finds upon inspection of the serial numbers on the indicator and bill, that the bill is out of place and should be removed, it is simply necessary to depress the reset key to close contacts R (Fig. 16). This, as is apparent, will send the machine through a total taking cycle during which the next bill is advanced and compared with the retained setting of the indicating counter. If this next bill is also not in agreement, the machine will stop again without resetting the counter. If inspection shows that several bills should be passed before agreement can be reached the operator may hold the reset key depressed in which event a succession of total taking cycles will ensue until the proper bill is reached whereupon the counter will automatically reset and card feeding and analyzing will automatically resume to accumulate data from the next group of cards which relate to the agreeing bill.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is

What is claimed is:

1. In a machine of the class described, means for analyzing classification designations of a record card, an entry receiving and retaining contact device, means controlled by said analyzing means to cause said device to receive classification data, means for analyzing classification designations of a bill and for comparing said designations with the setting of said contact device, resetting mechanism for said device, automatic group control means for causing said resetting mechanism to reset said device and the machine to continue running and means controlled by said comparing means upon non-agreement of said designations for preventing continued operation and resetting of said contact device.

2. In a machine of the class described, means for analyzing classification designations of a record card, an entry receiving and retaining device, means controlled by said analyzing means to cause said device to receive said classification data, a readout device associated with said entry receiving device and positionable thereby to represent said data, said readout device including a commutator and a relatively movable contact structure, means for resetting said structure to home position, means for analyzing classification designations of a bill, means for comparing said designations with the setting of said readout device and means controlled by said comparing means for controlling the operation of said resetting means.

3. In a machine of the class described, means for analyzing index point positions of a column of a record card, a commutator device, means under control of said analyzing means to cause a setting of said device to represent the value of the perforation analyzed, means for analyzing index point positions of a column of a bill, a circuit jointly completed by said device and said bill analyzing means upon agreement between the setting of said device and the location of the perforation in said bill, resetting means for said device, and means included in said circuit for controlling the operation of said resetting means to prevent resetting of said device upon disagreement between the setting of the device and the bill perforations.

4. In a machine of the class described, means for successively analyzing the separate cards of a plurality of groups of cards only one card of each of which groups of cards contains perforations representing a serial number, a commutator device, means controlled by said analyzing means to cause said device to receive and retain a setting of the serial number of the card of one of said groups, resetting means for said device, means for analyzing a succession of bills each of which contains perforations representing a serial number, means for comparing each bill serial number as the corresponding bill is analyzed with the setting of said device, and means controlled by said comparing means to enable said resetting means to automatically reset and said device upon agreement between the setting and the bill serial number analyzed.

5. In a machine of the class described, means for successively analyzing the separate cards of a plurality of groups of cards only one card of each of which groups of cards contains perforations representing a serial number, group control mechanism, total taking mechanism brought into operation by said group control mechanism, a commutator device, means controlled by said analyzing means to cause said device to receive and retain a setting of the serial number of one of said groups, resetting means for said device, means operative concurrently with said total taking mechanism for feeding and analyzing a bill having perforations representing a serial number, means for comparing the serial number analyzed with the setting of said commutator device and means controlled by said comparing means for preventing resetting of said device when there is non-agreement.

6. The invention set forth in claim 5 in which means is provided to cause repeated operation of said feeding and analyzing means to effect comparison between said setting and the serial number of one of a series of successively analyzed bills, said resetting being continually prevented until there is agreement.

7. In a machine of the class described, means for analyzing classification designations of a record card, an entry receiving and retaining device, means controlled by said analyzing means to cause said device to receive said classification data, a readout device associated with said entry receiving device and positionable thereby to represent said data, resetting mechanism for said devices, means for analyzing classification designations of a bill, means for comparing said designations with the setting of said readout device, and means controlled by said comparing means for controlling the operation of said resetting mechanism.

GEORGE F. DALY.